United States Patent [19]

Tanimizu et al.

[11] 4,171,501
[45] Oct. 16, 1979

[54] LIGHT EMITTING DEVICES BASED ON THE EXCITATION OF PHOSPHOR SCREENS

[75] Inventors: Shinkichi Tanimizu, Kokubunji; Teruki Suzuki, Funabashi; Tadashi Fukuzawa, Tokyo, all of Japan

[73] Assignee: Hitachi, Ltd., Japan

[21] Appl. No.: 849,241

[22] Filed: Nov. 7, 1977

Related U.S. Application Data

[62] Division of Ser. No. 516,953, Oct. 22, 1974, Pat. No. 4,107,571.

[30] Foreign Application Priority Data

Oct. 22, 1973 [JP] Japan .................. 48/117966
Oct. 22, 1973 [JP] Japan .................. 48/117967

[51] Int. Cl.$^2$ .................. H01J 61/16; H01J 61/44
[52] U.S. Cl. .................. 313/486; 252/301.4 P; 313/224
[58] Field of Search ............... 313/486, 226, 487, 224; 252/301.4 P, 301.4 R

[56] References Cited

U.S. PATENT DOCUMENTS

| | | | |
|---|---|---|---|
| 2,622,221 | 12/1952 | Beese | 313/185 X |
| 3,211,666 | 10/1965 | McAllister | 252/301.4 P |
| 3,250,722 | 5/1966 | Borchardt | 252/301.4 P |
| 3,647,706 | 3/1972 | Lagos | 252/301.4 P |
| 3,670,194 | 6/1972 | Thornton, Jr. et al. | 252/301.4 P X |
| 3,858,082 | 12/1974 | Thornton, Jr. | 313/487 |
| 3,916,245 | 10/1975 | Dorf et al. | 313/486 |

OTHER PUBLICATIONS

*Luminescence of Solids*, by H. W. Leverenz, 1950, pp. 248, 249.

Primary Examiner—Palmer C. Demeo
Attorney, Agent, or Firm—Craig & Antonelli

[57] ABSTRACT

A light emitting device wherein a blue screen or a red screen is excited by 5 to 25eV photons or electrons, the blue screen containing a self-activated phosphor which is represented by the general formula $MP_bV_{1-b}O_4$ where M stands for at least one member selected from the group consisting of yttrium (Y), scandium (Sc), rare-earth elements having atomic numbers of 57-62 and 64-71, and group-IIIb elements of the periodic table, and where $0<b<1.0$, the red screen containing a trivalent europium ($Eu^{3+}$) activated phosphor which is represented by the general formula $M_{1-a}Eu_aP_bV_{1-b}O_4$ where M stands for at least one member selected from the group consisting of yttrium (Y), scandium (Sc), rare-earth elements having atomic numbers of 57-62 and 64-71, and group-IIIb elements of the periodic table, and where $0<a<1.0$ and $0<b\leq1.0$.

14 Claims, 12 Drawing Figures

LIGHT EMITTING DEVICES BASED ON THE EXCITATION OF PHOSPHOR SCREENS

This is a division of application Ser. No. 516,953, filed Oct. 22, 1974 now U.S. Pat. No. 4,107,571.

BACKGROUND OF THE INVENTION

1. Field of the Invention

This invention relates to three-color plasma-panel display devices, fluorescent lamps and display devices equipped with low-energy electron sources.

2. Description of the Prior Art

The 253.7 nm radiation from mercury vapor has hitherto been widely and generally utilized for exciting phosphor screens. In recent years, however, it has been recognized that mercury is detrimental to the human body, and the development of light emitting devices employing no mercury has been being carried forward. In, for example, a fluorescent discharge lamp for illumination, it is desirable to excite a phosphor by ultraviolet radiation shorter than 253.7 nm, but being preferably chosen to be between 58.4 nm and 250 nm. The first resonance line and ionization potential of helium gas lie at 58.4 nm and 50.4 nm. In terms of the energy of photons, such wavelengths correspond to an energy range of 5 eV to 25 eV.

In a display tube equipped with a low-energy electron source, the upper limit of the accelerating voltage should desirably be 25 V in consideration of the first ionization potential 24.581 eV (50.4 nm) of helium and also the maximum plasmon energy of various phosphors to be utilized for a solid luminescent screen.

A gas discharge cell which contains phosphors therein and in which they absorb the energy of gas plasma to emit different colors of light, has been known from U.S. Pat. No. 3,559,190. An attempt to obtain multicolor in plasma-display devices containing well-known phosphors and vacuum ultraviolet radiation sources has been reported in "Three-Color-Plasma-Panel-Display Device" prepared by F. H. Brown, C. W. Salisbury, H. G. Slottow and M. J. Tamm, Owens-Illinois, Inc., Ohio, under Contract No. DAAB 07-70-C-0243, December, 1970). Therefore, it will be regarded as being already known to use, for example, lead activated calcium tungstate phosphor ($CaWO_4$:Pb) for blue of the three primary colors, manganese activated zinc silicate phosphor ($Zn_2SiO_4$:Mn) for green, and europium activated yttrium vanadate phosphor ($YVO_4$:Eu) for red.

Where the above-mentioned lead activated calcium tungstate is employed for a blue emitting device associated with this invention, the following two disadvantages are involved. The first is that although the phosphor has comparatively high luminous efficiency under 253.7 nm excitation and also usual X-ray excitation, the luminescence when excited by 5 to 25 eV photons or electrons is feeble. For example, it is difficult to obtain an intensity ratio of more than 70% under 147 nm excitation relative to the luminescence intensity under 253.7 nm excitation even by controlling the shape of the individual phosphor particles and also by optimizing the activator concentration. The second is that the emission spectrum of the phosphor is very wide and then the purity of blue color is extremely inferior as will be stated later.

On the other hand, where the europium activated yttrium vanadate phosphor described in the report is employed for a red light emitting device associated with this invention, the following two disadvantages are involved. The first is that although the phosphor has comparatively high luminous efficiency under 365 nm (3.4 eV) or 253.7 nm (4.8 eV) excitation and also under the usual electron beam excitation of 8–25 eV, the luminencence when excited by 5 to 25 eV photons or electrons is feeble. For example, it is difficult to obtain an intensity ratio of more than 60% under 147 nm excitation relative to the luminescence intensity under 253.7 nm excitation even by controlling the shape of individual phosphor particles and also by optimizing the activator concentration. The second is that where the phosphor is used in combination with a well-known green phosphor, such as manganese activated zinc silicate phosphor and any suitable blue phosphor in a three-primary-color plasma display device which is operated by an identical discharge current, it is difficult to establish the white balance because the green phosphor is very good in color purity and reveals high brightness.

When the excitation energy of 5–25 eV according to the present invention is compared with that of the photons or electrons widely employed, there exists two peculiar points stated hereunder. As the first peculiarity, the excitation energy is higher than that of characteristic absorption (3–5 eV) of various activators or sensitizers to be added to the phosphors, and belongs to an energy region equal to or higher than the energy of the fundamental absorption edge of various phosphors. The second peculiarity is that the excitation energy belongs to an energy region equal to or lower than the plasmon energy in a number of insulating inorganic phosphors. Therefore, when a well-known blue phosphor such as zinc sulfide activated by silver and co-activated by chlorine (ZnS:Ag:Cl) is used jointly with the exciting source of this invention, the phosphor does not reveal high efficiency, because it is difficult to convert transmission of the plasmon energy effectively to the activator. The situation is the same with a red phosphor, for examle, europium activated yttrium oxide ($Y_2O_3$:Eu), yttrium oxysulfide ($Y_2O_2S$:Eu) and yttrium vanadate ($YVO_4$:Eu). In order to get efficiency under excitation of 5–25 eV, a phosphor composition having a unique property in the absorption and relaxation processes of the excitation energy is accordingly requested.

SUMMARY OF THE INVENTION

The first object of this invention is to provide a blue or red emitting device for the three-color plasma display and the numerical display, which eliminates the two disadvantages stated above and which has high luminous efficiency. The second object is to provide a fluorescent discharge lamp for illumination, which is free from the fear of inflicting injury upon the human body even when discarded by unspecified many users, in other words, which does not employ mercury vapor as a main exciting source.

The light emitting device of this invention comprises a light-permeable envelope, an exciting source ranging from 5 to 25 eV, and a light emitting screen which is provided inside of the envelope at which it can convert the excitation energy into visible light, the light emitting screen containing a phosphor represented by the general formula $M_{1-a}Eu_aP_bV_{1-b}O_4$ (where M stands for at least one member selected from the group consisting of yttrium (Y), scandium (Sc), rare-earth elements having atomic numbers of 57–62 and 64–71, and group- IIIb elements of the periodic table, and where $0 \leq a < 1.0$ and $0 < b \leq 1.0$).

More specifically, the light emitting device of this invention for the blue luminescence is constructed of a blue screen which contains a self-activated phosphor represented by the general formula $MP_bV_{1-b}O_4$ (where M stands for at least one member selected from the group consisting of yttrium (Y), scandium (Sc), rare-earth elements having atomic numbers of 57–62 and 64–71, and group-IIIb elements of the periodic table, and where $0 < b < 1.0$). The light emitting device for the red luminescence is constructed of a red screen which contains a trivalent europium ($Eu^{3+}$) activated phosphor represented by the general formula $M_{1-a}Eu_aP_bV_{1-b}O_4$ (where M stands for at least one member selected from the group consisting of yttrium (Y), scandium (Sc), rare-earth elements having atomic numbers of 57–62 and 64–71, and group-IIIb elements of the periodic table, and where $0 < a < 1.0$ and $0 < b \leq 1.0$). The light emitting screens are characterized by having high luminous efficiency especially for the excitation energy of 5–25 eV.

In this respect, the inventors studied in detail, and examined the relaxation processes of absorbed energy on a large number of sulfides, oxides, silicates, phosphates, aluminates and other oxygen dominated lattices, halides, etc. As the result, they came to the conclusion that the phosphor to be excited by 5–25 eV photons or electrons should desirably fulfill the following three conditions. The first condition is that the host lattice of the phosphor is an inorganic compound which is represented by the general formula $RMX_4$ as described in "Crystal Structure" Vol. 3, by R. W. G. Wyckoff, 2nd Edition, Interscience Publishers, New York, 1965 and in which the $MX_4$-group has a tetrahedral structure of anion complex containing a cation at the center and four oxygens at the corners. The second condition is that the number of the molecular ions contained in a unit cell of the host lattice must be large. The third condition is that the lattice energy of the host lattice must be great. Concretely, compounds satisfy the three conditions are those which have the willemite structure and the zircon structure or a crystal structure, known as the modification thereof, such as the zenotime structure, scheelite structure, and those which have preferably smaller volume of the crystal unit cell. Further, the compounds should desirably have no photoconductivity and be rather prone to accumulate surface charges when excited by 8 to 25 eV electron beams.

When such requisites are referred to the well-known phosphors previously exemplified; zinc sulfide does not fulfill the first condition, and lead activated calcium tungstate does not fulfill the third condition. On these phosphors, the excitation spectrum of 450 nm component was actually measured. As the result, the excitation intensity in a vacuum ultraviolet region (wavelength region below 200 nm) was less than 10% of the excitation intensity at 253.7 nm for zinc sulfide, while it was less than 75% for lead activated calcium tungstate. In contrast, both the blue and red phosphors constituting the light emitting device of this invention have a solid solution form of vanadate and phosphate, thereby to reduce the volume of the crystal unit cell and to increase the lattice energy, making it possible to shift the fundamental absorption edges onto the higher energy side. Moreover, the optical phonon energy based on the molecular vibration of constituent anions is great. The phosphors are therefore effective to remarkably diminish the probability of the nonradiative transition from highly excited states to the lowest emitting state of the activator ions.

Other features and advantages of this invention will be hereunder described in detail in conjunction with embodiments by reference to the accompanying drawing. It is to be understood, however, that the embodiments do not restrict this invention thereto, but that various improvements and modifications can be made within the scope of this invention.

DESCRIPTION OF THE PREFERRED EMBODIMENTS

Embodiment 1

Self-activated blue phosphors represented by the formula $YP_bV_{1-b}O_4$ ($0 < b < 1.0$) were prepared by a method stated below. For example, as regards a compound in which $b = 0.85$ and whose total amount of charge was 100 gr., the following three raw materials were mixed well:

| | |
|---|---|
| yttrium oxide ($Y_2O_3$) | 7.2 gr. |
| yttrium phosphate ($YPO_4 \cdot 2H_2O$) | 79.2 gr. |
| vanadium pentaoxide ($V_2O_5$) | 9.6 gr. |

Thereafter, hygroscopic

| | |
|---|---|
| sodium carbonate (Na$_2$CO$_3$) | 4.0 gr. | was added to the mixture. The resultant mixture was mixed again, was charged into an opaque quartz crucible, and was fired at 1,250° C. for 3 hours in the air atmosphere in the semi-closed state. In order to remove excess vanadium, the fired mixture obtained had water poured thereon. After it was let to stand for a suitable period of time, it was passed through a sieve of 250 meshes. The mixture having passed through the sieve was let to stand still and thereafter a supernatant liquid was taken away. The remaining precipitate was carefully washed with an aqueous solution of 2 weight % of ammonium carbonate [(NH$_4$)$_2$CO$_3$], and it was finally washed in water. The washed precipitate was dried at 200° C. for 24 hours. Then, a pure-white phosphor was obtained. The relationship between the phosphor compositions differing in the value b and the luminescence characteristics will be stated in detail later.

Embodiment 2

Blue phosphors similar to that of Embodiment 1 were fired by employing diammonium hydrogen phosphate in place of yttrium phosphate. That is,

| | |
|---|---|
| yttrium oxide (Y$_2$O$_3$) | 43.3 gr. |
| diammonium hydrogen phosphate [(NH$_4$)$_2$HPO$_4$] | 47.3 gr. |
| vanadium pentaoxide (V$_2$O$_5$) | 5.8 gr. |
| were mixed well. Thereafter, hygroscopic sodium carbonate (Na$_2$CO$_3$) | 3.6 gr | was added to the mixture, and the resultant mixture was mixed again. By the same method as in Embodiment 1, firing and after-treatment were carried out. Then, a pure-white phosphor was obtained.

Figure 1:
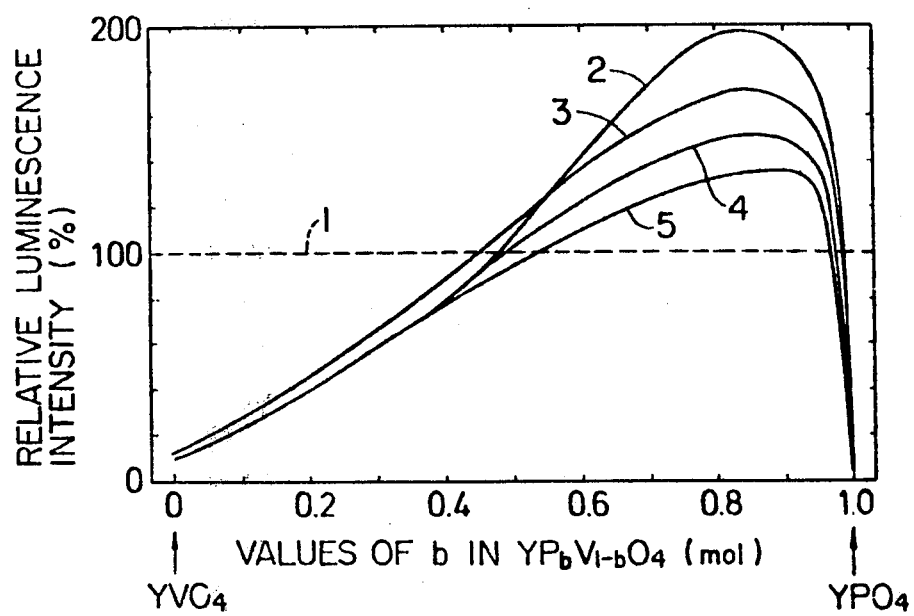
FIG. 1 shows the luminescence intensity as a function of the value b in $YP_bV_{1-b}O_4$ ($0 < b < 1.0$) where the luminescence intensity of lead activated calcium tungstate under 147 nm excitation is adopted as 100% (broken line 1 in the figure)

FIG. 1 shows the luminescence intensities under 147 nm (one of the xenon resonance lines) excitation for the lead activated calcium tungstate phosphors previously exemplified and the phosphors obtained by Embodiments 1 and 2. The horizontal axis in the figure represents the values b at M=Y (yttrium) in the general formula MP$_b$V$_{1-b}$O$_4$, while the vertical axis represents the luminescence intensities of the phosphors of this invention where the luminescence intensity of the well-known phosphor, lead activated calcium tungstate under 147 nm excitation was adopted as 100 (broken line 1 in the figure). Four solid lines in the figure represent different components of a blue band. The lines 2, 3, 4 and 5 correspond to 427 nm, 450 nm, 470 nm and 490 nm components, respectively.

As apparent from the figure, the luminescence intensity became 100% or greater in a region of $0.5 < b < 1.0$. In a composition of $b=0.85$, that is, YP$_{0.85}$V$_{0.15}$O$_4$, the luminencence intensity took the maximum value. For example, the relative intensity of the 450 nm component at the curve 3 reached 170%.

Figure 2:
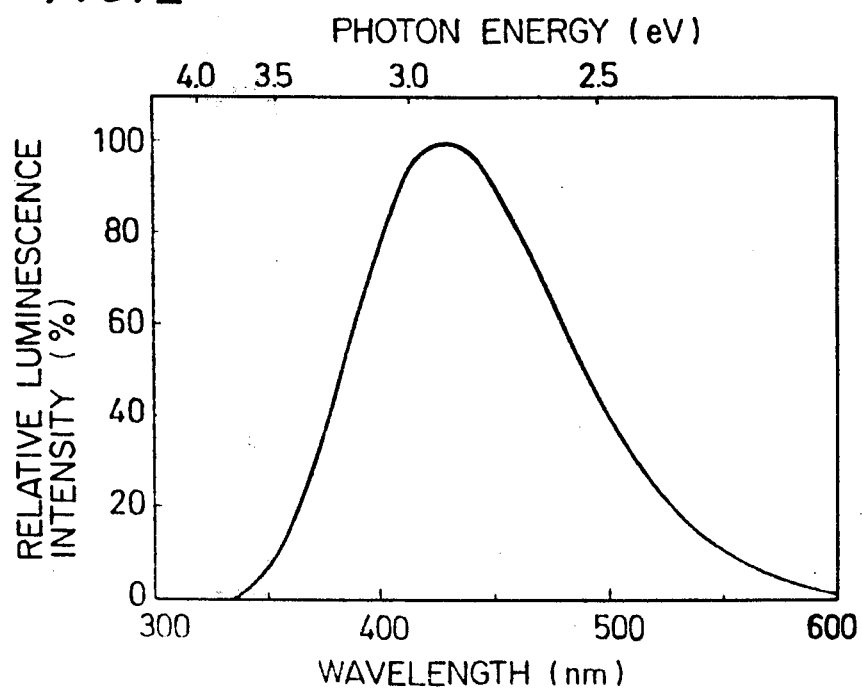
FIG. 2 shows the luminescence spectrum of $YP_{0.85}V_{0.15}O_4$ by the 147 nm excitation as a function of the wavelength under 58.4–290 nm excitation.

FIG. 2 shows the luminescence spectrum of YP$_{0.85}$V$_{0.15}$O$_4$ as a function of the wavelength under 58.4-290 nm excitation. The luminescence peak appears in the range of 425-430 nm and the half-width is about 100 nm independently of the excitation wavelengths. As will be stated later, C.I.E. plots of the phosphors were substantially constant independently of the values b.

Figure 3:
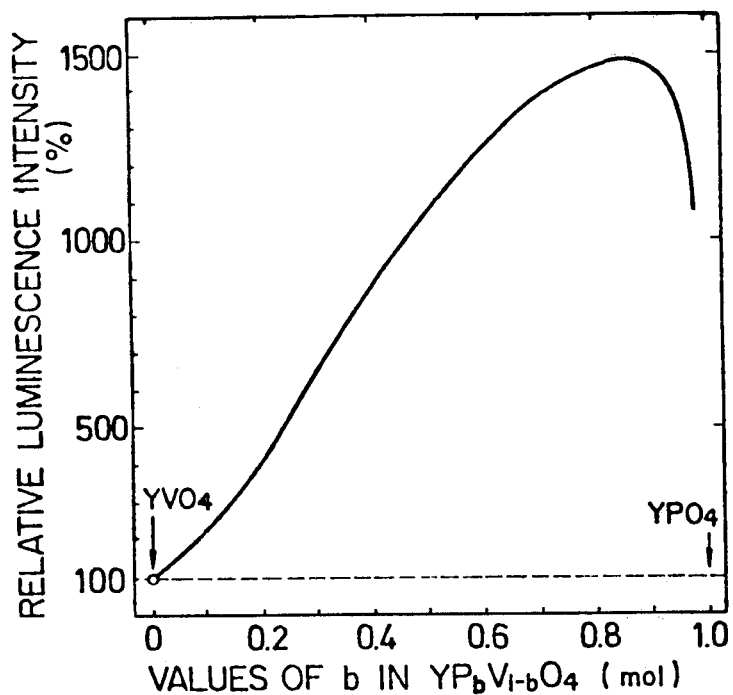
FIG. 3 shows the luminescence intensity as a function of the value b in $YP_bV_{1-b}O_4$ ($0 < b < 1.0$) where the luminescence intensity of yttrium vanadate under the 147 nm excitation is adopted as 100%.

FIG. 3 shows the luminescence intensities of the phosphors as a function of the value b, where the luminescence intensity of the 450 nm component of YVO$_4$ (a composition at $b=0$ in YP$_b$V$_{1-b}$O$_4$) under 147 nm excitation is adopted as 100. As apparent from the figure, luminescence intensities above 100% were attained over the entire composition region of $0 < b < 1.0$. The highest luminescence intensity of 14.80% was exhibited at $b=0.85$.

Figure 4:
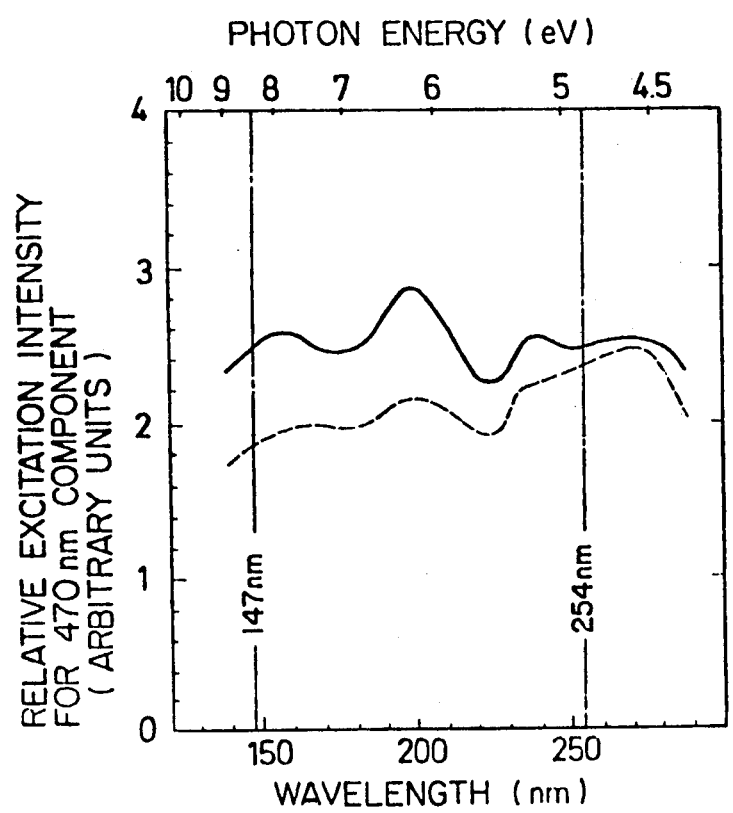
FIG. 4 shows the excitation spectra of the 470 nm components for lead activated calcium tungstate and $YP_{0.85}V_{0.15}O_4$ in a region of 130–290 nm.

FIG. 4 shows the excitation spectra of the 470 nm component which is longer in wavelength than the blue component as shown in FIG. 3 and which is preferable as the blue component of a plasma color display, for the well-known lead activated calcium tungstate phosphor (broken line in the figure) and for the phosphor of this invention YP$_{0.85}$V$_{0.15}$O$_4$ (solid line in the figure). The excitation intensity of the well-known phosphor at 147 nm is below 80% of that at 253.7 nm, whereas the phosphor of this invention exhibits substantially equal excitation intensities at both the wavelengths.

It is also easily understood from FIG. 4 that when the phosphor of this invention is excited at a wavelength in the vicinity of 200 nm, the luminescence intensity still increases in comparison with the case of the excitation at 147 nm or 253.7 nm.

The above embodiments are concerned with the self-activated blue phosphors at M=Y (yttrium) in the general formula MP$_b$V$_{1-b}$O$_4$. In case of self-activated phosphors in which M stands for Sc (scandium) and In (indium) according to the previously cited "Crystal Structure" Vol. 3 by Wyckoff, similar effects are achieved by the adjustments of the value b even though the luminescence spectra are somewhat different.

The above embodiments are also concerned with the characteristics on the powder phosphor which become the constituting elements of light emitting devices. A phosphor screen obtained by mixing an adequate amount of binder into such powder phosphors and coating on a glass substrate reveals similar characteristics as those on the powder phosphors and has a good maintenance. Effects of this kind will be described in the following embodiments.

Embodiment 3

There was fabricated a fluorescent discharge lamp which does not use mercury vapor at all and which is of such type that 147 nm radiation is generated in the positive column region of a discharge space and that the radiation is converted into visible light. In the first stage, and adequate amount of glass powder was mixed into any of the phosphors, as shown, in Embodiments 1 and 2. In the second stage, an acrylic thinner solution was dropped into the mixture to prepare a phosphor suspension having an appropriate viscosity. Thereafter, the suspension was poured through a nozzle from one end of a commercial fluorescent discharge tube having a diameter of 25 mm $\phi$ or 32 mm $\phi$. Alternatively, it was printed through a stainless steel sieve of 250 meshes onto a glass substrate of 150 mm×150 mm×1 mm. Thereafter, the suspension was baked in the air at temperatures below 600° C. for 2-3 hours, to form a uniform phosphor screen having a predetermined thickness of 15-30 microns. The phosphor screen printed on the glass substrate was cut along with the substrate into small square pieces being 10-15 mm long in one side. The small piece was inserted into the commercial discharge tube and fixed with a nickel or glass holder. After the usual filament mounting work and baking work, the tube was filled with 1 Torr of purified xenon (Xe). Thus, the fluorescent lamp without mercury vapor was manufactured. The A.C. starting voltage $V_s$ of the discharge lamp having a tube diameter of 32 mm $\phi$ and a tube length of 500 mm was 170 V, while the tube current density $I_L$ under the steady discharge could change from 0.02 A/cm$^2$ to 0.07 A/cm$^2$.

Examples of the relative brightnesses of the phosphor screens at $I_L=0.044$ A/cm$^2$ (fixed) are given in Table 1.

TABLE 1

| | Phosphor Composition | Presence or Absence of Glass Powder | Relative Brightness |
|---|---|---|---|
| 1 | CaWO$_4$ . Pb | Absent | 100 |
| 2 | CaWO$_4$ . Pb | Present | 66 |
| 3 | YP$_{0.85}$V$_{0.15}$O$_4$ | Absent | 110 |
| 4 | YP$_{0.85}$V$_{0.15}$O$_4$ | Present | 79 |
| 5 | YP$_{0.90}$V$_{0.10}$O$_4$ | Present | 81 |

As apparent from the table, the relative brightness of the identical phosphor decreases due to the mixing of the glass powder. When, in this regard, the phosphor screen associated with this invention and the well-known phosphor screen made of lead activated calcium tungstate are compared, the brightness of the previously known phosphor composition is 66 while that of the phosphor composition of this invention is about 80, and it is understood that the brightness associated with this invention increases at 20% or higher. This result corresponds well to the results of the comparisons of the characteristics on the powder phosphors described in detail in connection with Embodiments 1 and 2. Regarding the actually mounted phosphor screens, it has also been confirmed that the effect of this invention is remarkable.

Figure 5:
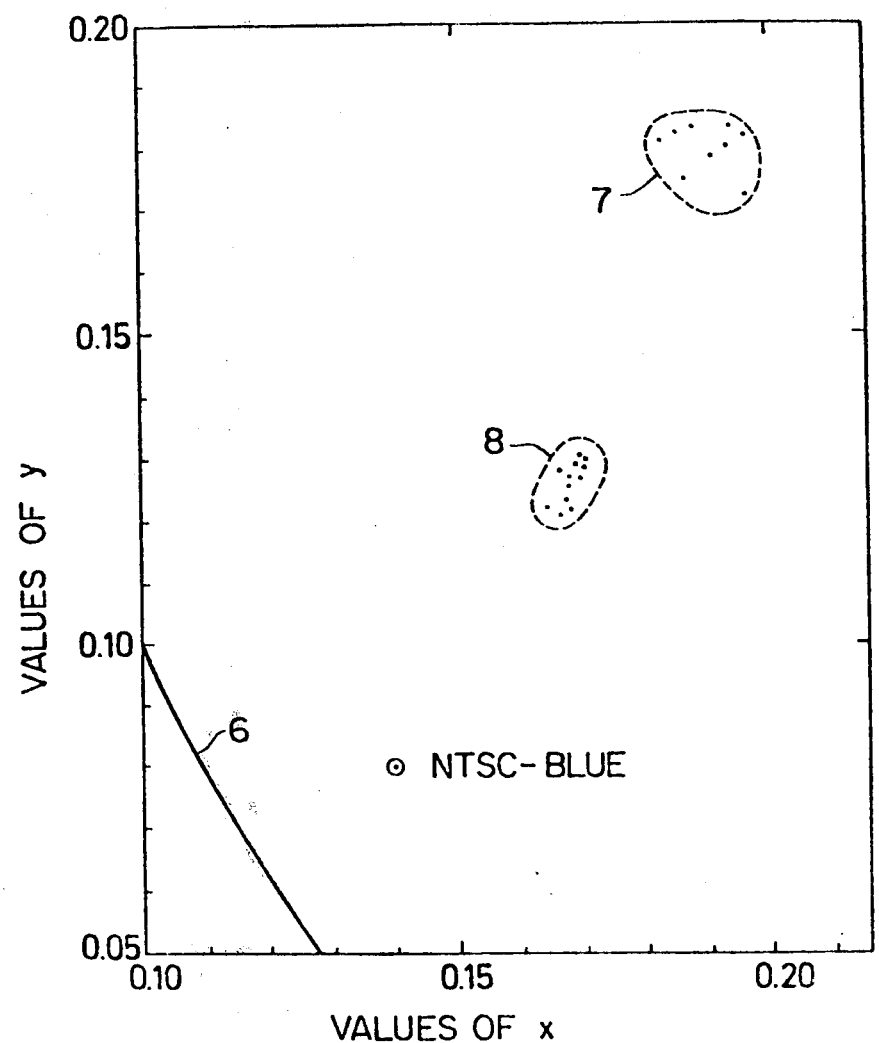
FIG. 5 is a diagram of the C.I.E. coordinates for phosphor films actually equipped in a xenon-filled discharge lamp.

Further, improvements have been made in point of the color purity. FIG. 5 shows the C.I.E. coordinates (x,y) of the phosphor screens which were actually mounted on the xenon-filled fluorescent discharge lamp fabricated in Embodiment 3. A solid line 6 shown in the lower part of the figure represents a part of a horseshoe-shaped spectral locus curve. Black spots enclosed with a broken line 7 denote actually measured coordinates for the phosphor screens of lead activated calcium tungstate, while black spots enclosed with a broken line 8 denote actually measured coordinates of the phosphor screens of YP$_{0.85}$ to $_{0.90}$V$_{0.15}$ to $_{0.10}$O$_4$ obtained in Embodiments 1 and 2. A white spot in the figure shows the blue spot (0.14, 0.08) prescribed by the NTSC system. As apparent from the figure, the spots 8 are located nearly on the middle point of a straight line which joins the NTSC blue spot and the spots 7. This confirms that the improvement of the color purity is remarkable in the light emitting device of this invention.

Embodiment 4

Figure 6:
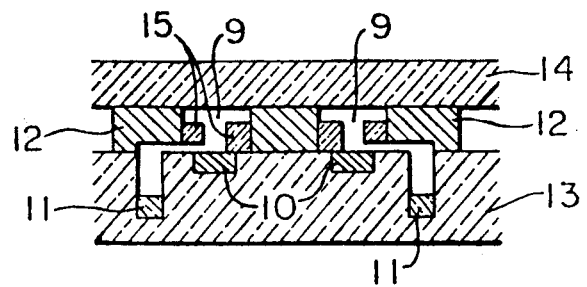
FIG. 6 diagrammatically shows partially in cross-section a gas discharge cell, according to the invention.

A xenon gas discharge cell applicable for a plasma panel display was fabricated. FIG. 6 shows partially in cross-section the discharge cell. Numeral 9 designates a discharge space, 10 a main discharge anode, 11 a subsidiary discharge anode, and 12 a cathode.

These electrodes were supported by a glass substrate 13 and a front panel glass 14. Numeral 15 is a phosphor screen having 1 mm $\phi$ diameter at maximum. Through a hole provided at the center of the phosphor screen, the stable discharge can be carried out. The discharge cell filled with xenon gas was operated by the conventional self-scanning system. The relative brightness of the discharge cell under pressure of 20-100 Torr was nearly the same as already shown in Table 1, and the chromaticity plots were the same as already shown in FIG. 5. Although the effects of this invention have been described in detail in conjunction with the above four embodiments, some additional explanation will be made hereunder concerning the application field of this invention. If the discharge space of a hot cathode type lamp described in Embodiment 3 is extremely reduced, a cold cathode type structure as described in Embodiment 4 is realized. And then, a well-known "mini-cell" can be established as a result of reducing the ratio of the positive column space to the negative glow space. Accordingly, lowering in the color purity of the light emitting screen as attributed to the super position of the positive column spectrum is negligible, and a good plasma display is possible.

On the other hand, in order to produce a white color for the application field of illumination, it is desirable to use a combination of the blue and red phosphors of this invention with green phosphors. After mixing these phorphors at an appropriate ratio, the mixture is coated onto the inner wall of a hot cathode type discharge tube by the method described in Embodiment 3, together with a rare gas such as xenon, krypton, argon and neon. The mean color rendering index of the discharge lamp can be adjusted, not only by changing the mixing ratios of the phosphors, but also by selecting the rare gas combinations. When only two color phosphors of this invention are used together with a mixture gas consisting of neon and xenon, the discharge tubes can be utilized for a lamp in the field of growth or admiration of plants.

Since the fluorescent discharge lamp of this type does not involve mercury vapor as the irradiation source, it has the great advantage of no longer detrimental to the human body. Where the light emitting screen of this invention is employed for a blue indicator, both types of structures described in Embodiments 3 and 4 can be used. However, it is desirable to utilize a system which can emit low energy electrons from helium gas plasma. A simple structure of this type consists of a gas plasma as a source of free electrons, a cold cathode and a positively biased anode. Above the anode an insulating layer and a phosphor screen associated with this invention are provided. In operation, the gas plasma generated between the cathode and the anode diffuses above the phosphor screen and then free electrons can be injected into the phosphor screen which results in emitting visible light.

Embodiment 5

Self-activated blue phosphors represented by the formula LuP$_b$V$_{1-b}$O$_4$ (0<b<1.0) were prepared. For example, for a compound in which b=0.85 and whose total amount of charge was 100 gr., the following three raw materials were mixed well:

| | |
|---|---|
| lutetium oxide (Lu$_2$O$_3$) | 57.4 gr. |
| diammonium hydrogen phosphate [(NH$_4$)$_2$HPO$_4$] | 35.6 gr. |
| vanadium pentaoxide (V$_2$O$_5$) | 4.3 gr. |
| Thereafter, hygroscopic sodium carbonate (Na$_2$CO$_3$) | 2.7 gr. | was added to the mixture. The resultant mixture was mixed again, and was fired by the method similar to that of Embodiment 1. Thus, a white phosphor was obtained. The special profile of the emission band of $LuP_{0.85}V_{0.15}O_4$ under 147 nm excitation was similar to that of the $YP_{0.85}V_{0.15}O_4$ as shown in FIG. 2. The luminescence intensity of the former was higher by 4% than that of the latter.

Embodiment 6

Self-activated blue phosphor represented by the formula $GdP_bV_{1-b}O_4$ ($0 < b < 1.0$) were prepared. For example, for a compound in which $b = 0.60$ and whose total amount of charge was 100 gr., the following three raw materials were mixed well:

| | |
|---|---|
| gadolinium oxide ($Gd_2O_3$) | 57.0 gr. |
| diammonium hydrogen phosphate [$(NH_4)_2HPO_4$] | 27.4 gr. |
| vanadium pentaoxide ($V_2O_5$) | 12.6 gr. |
| Thereafter, hygroscopic sodium carbonate ($Na_2CO_3$) | 3.0 gr. | was added to the mixture. The resultant mixture was mixed again, and was fired by the method as in Embodiment 1. Thus, a pure-white phosphor was obtained. The luminescence peak of $GdP_{0.60}V_{0.40}O_4$ under 147 nm excitation was 450 nm and the half-width was 110 nm. The luminescence intensity of this phosphor was the same as that of $YP_{0.85}V_{0.15}O_4$.

Embodiment 7

Self-activated blue phosphors represented by the general formula $Y_{0.98}M'_{0.02}P_{0.85}V_{0.15}O_4$, where M' stands for Al, Ga and In, were prepared. The contents for blending the case of M' = Al were as follows:

| | |
|---|---|
| yttrium oxide ($Y_2O_3$) | 42.6 gr. |
| aluminum hydroxide [$Al(OH)_3$] | 0.6 gr. |
| diammonium hydrogen phosphate [$(NH_4)_2HPO_4$] | 47.5 gr. |
| vanadium pentaoxide ($V_2O_5$) | 5.8 gr. |

The contents for blending in the case of M' = Ga were:

| | |
|---|---|
| yttrium oxide ($Y_2O_3$) | 42.5 gr. |
| gallium oxide ($Ga_2O_3$) | 0.7 gr. |
| diammonium hydrogen phosphate [$(NH_4)_2HPO_4$] | 47.4 gr. |
| vanadium pentaoxide ($V_2O_5$) | 5.8 gr. |

The contents for blending in the case of M' = In were:

| | |
|---|---|
| yttrium oxide ($Y_2O_3$) | 42.4 gr. |
| indium oxide ($In_2O_3$) | 1.1 gr. |
| diammonium hydrogen phosphate [$(NH_4)_2HPO_4$] | 47.4 gr. |
| vanadium pentaoxide ($V_2O_5$) | 5.8 gr. |

The respective starting materials were mixed well. Thereafter,

| | |
|---|---|
| sodium carbonate ($Na_2CO_3$) | 3.6 gr. | was added to the respective mixtures. The resultant mixtures were mixed again and were pre-fired at 800° C. for half an hour, and thereafter they were fired at 1,250° C. for an hour. The above two-step firing procedure is required to produce the pure-white color phosphors. The method of after-treatment was similar as described in Embodiments 1 and 2.

The luminescence intensities of these phosphors under 147 nm excitation were higher than that of lead activated calcium tungstate phosphor irrespective of M'. In particular $Y_{0.98}Ga_{0.02}P_{0.85}V_{0.15}O_4$ revealed the highest characteristic among the three phosphors containing group-IIIb elements.

Embodiment 8

Self-activated blue phosphors represented by the general formula $Y_{0.98}M''_{0.02}P_{0.85}V_{0.15}O_4$, where M'' stands for Sc, Gd and Lu, were prepared. The contents for blending in the case of M'' were as follows:

| | |
|---|---|
| yttrium oxide ($Y_2O_3$) | 42.6 gr. |
| scandium oxide ($Sc_2O_3$) | 0.5 gr. |
| diammonium hydrogen phosphate [$(NH_4)_2HPO_4$] | 47.5 gr. |
| vanadium pentaoxide ($V_2O_5$) | 5.8 gr. |

The contents for blending in the case of M'' = Lu were:

| | |
|---|---|
| yttrium oxide ($Y_2O_3$) | 42.2 gr. |
| lutecium oxide ($Lu_2O_3$) | 1.5 gr. |
| diammonium hydrogen phosphate [$(NH_4)_2HPO_4$] | 47.0 gr. |
| vanadium pentaoxide ($V_2O_5$) | 5.7 gr. |

The contents for blending in the case of M'' = Gd were:

| | |
|---|---|
| yttrium oxide ($Y_2O_3$) | 42.6 gr. |
| gadolinium oxide ($Gd_2O_3$) | 1.4 gr. |
| diammonium hydrogen phosphate [$(NH_4)_2HPO_4$] | 47.1 gr. |
| vanadium pentaoxide ($V_2O_5$) | 5.7 gr. |

The respective starting materials were mixed well. Thereafter,

| | |
|---|---|
| sodium carbonate ($Na_2CO_3$) | 3.6 gr. | was added to the respective mixtures. The resultant mixtures were mixed again, and were fired by the same method as described in Embodiment 7.

The luminescence intensities of these phosphors under 147 nm excitation were higher than that of lead activated calcium tungstate irrespective of M''. In particular, $Y_{0.98}Gd_{0.02}P_{0.85}V_{0.15}O_4$ revealed the highest characteristics among the 3 phosphors containing different rare-earth elements.

The above eight embodiments are concerned with the blue phosphors according to this invention. When producing these phosphors, diammonium hydrogen phosphate was used as the starting material of phosphorus, and the firing temperature was 1,250° C. An alternative to these methods will be explained in the following embodiment.

Embodiment 9

In order to produce $VP_{0.85}V_{0.15}O_4$, 14 specimens were fired with different starting materials and with different firing temperatures. Seven specimens were blended with $(NH_4)_2HPO_4$ and the remainder with YPO$_4$. The firing temperature of each of the 7 specimens was varied from 1,100° C. to 1,700° C. at intervals of 100° C.

Figure 7:
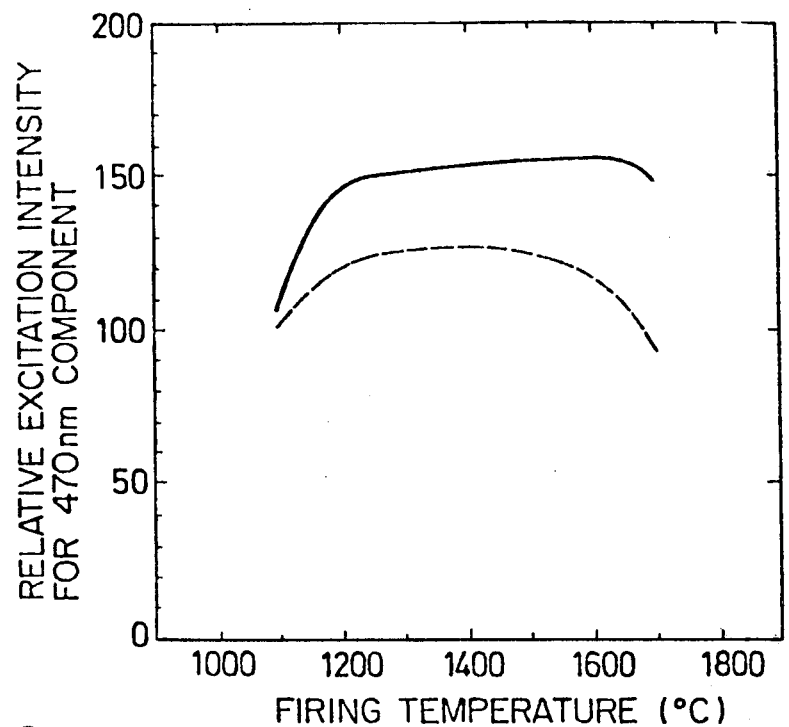
FIG. 7 shows the luminescence intensity of the 470 nm component for $YP_{0.85}V_{0.15}O_4$ under 147 nm excitation as a function of firing temperature.

FIG. 7 shows the luminescence intensity under 147 nm excitation as a function of the firing temperature. The vertical axis representes the luminescence intensity of 470 nm component under 147 nm excitation where the intensity of CaWO$_4$:Pb is adopted as 100. A solid curve denotes the characteristics of the specimens blended with YPO$_4$, while a broken curve denotes the characteristic of the specimens blended with (NH$_4$)$_2$HPO$_4$. It is clear from the figure that the solid curve lies above the broken curve. For the specimens blended with (NH$_4$)$_2$HPO$_4$, a NH$_3$-gas generated by the decomposition of (NH$_4$)$_2$HPO$_4$ reduces VO$_4^{3-}$ and precipitates low-valency vanadium such as V$^{4+}$, V$^{3+}$ and V$^{2+}$ during firing procedure which results in quenching of the luminescence intensity. On the other hand, for the specimens blended with YPO$_4$ any precipitation does not occur. Furthermore, grain growth becomes predominant when fired at high temperature. For example, the nominal diameter evaluated from an electron microscope photograph was 1.3μ at 1,300° C., 1.6μ at 1,400° C. and 2.4μ at 1,500° C., respectively. With increasing grain size, the light intensity under vacuum ultraviolet excitation becomes greater.

These effects are not restricted to the case of YP$_{0.85}$V$_{0.15}$O$_4$. It is already confirmed to be effective to use ScPO$_4$, LuPO$_4$ and GdPO$_4$ as the starting materials of phosphors.

Embodiment 10

Red phosphors represented by the formula Y$_{0.96}$Eu$_{0.04}$(P$_b$V$_{1-b}$)O$_4$ where $0 < b \leq 1.0$ were prepared. For example, for a compound in which b=0.65 and whose total amount of charge was 100 gr., the following four raw materials were mixed well:

| | |
|---|---|
| yttrium oxide (Y$_2$O$_3$) | 14.9 gr. |
| europium oxide (Eu$_2$O$_3$) | 3.0 gr. |
| yttrium phosphate (YPO$_4$ . 2H$_2$O) | 60.8 gr. |
| vanadium pentaoxide (V$_2$O$_5$) | 17.4 gr. |
| Thereafter, hygroscopic sodium carbonate (Na$_2$CO$_3$) | 3.9 gr. | was added to the mixture. The resultant mixture was charged into an opaque quartz crucible, and was fired in the air at 1,250° C., for 3 hours in the air atmosphere in the semi-closed state. In order to remove excess vanadium, the fired mixture obtained had water poured thereon. After it was let to stand for a suitable period of time, it was passed through a sieve of 250 meshes. The mixture having passed through the sieve was let to stand still, and thereafter a supernatant liquid was taken away. The remaining precipitate was carefully washed with an aqueous solution of 2 weight% of ammonium carbonate [(NH$_4$)$_2$CO$_3$], and it was finally washed in water. The washed precipitate was dried at 200° C. for 24 hours. Then, a pure-white phosphor was obtained. The relationship between the phosphor compositions differing in the value b and the light emitting characteristics will be stated later.

Embodiment 11

Red phosphors similar to that described in Embodiment 10 were fired by employing diammonium hydrogen phosphate in place of yttrium phosphate. The following raw materials

| | |
|---|---|
| yttrium oxide (Y$_2$O$_3$) | 42.6 gr. |
| europium oxide (Eu$_2$O$_3$) | 2.8 gr. |
| diammonium hydrogen phosphate [(NH$_4$)$_2$HPO$_4$] | 37.1 gr. |
| vanadium pentaoxide (V$_2$O$_5$) | 13.8 gr. |
| were mixed well. Thereafter, hygroscopic sodium carbonate (Na$_2$CO$_3$) | 3.7 gr. | was added to the mixture, and the resultant mixture was fired by the same method as described in Embodiment 10. Then, a pure-white phosphor was obtained.

Figure 8:
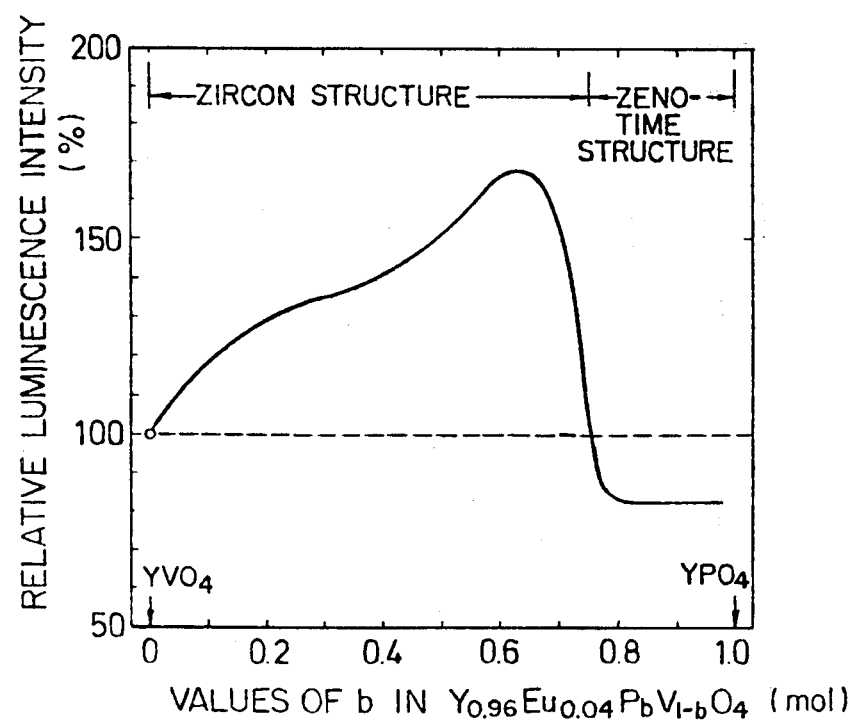
FIG. 8 shows the relationship between the value b in $Y_{0.96}Eu_{0.04}P_bV_{1-b}O_4$ and the luminescence intensity under 147 nm excitation.

FIG. 8 shows the luminescence intensity of Y$_{0.96}$Eu$_{0.04}$(P$_b$V$_{1-b}$)O$_4$ where $0 < b \leq 1.0$ under 147 nm excitation as a function of the value b. In this figure, the luminescence intensity of europium activated yttrium vanadate (YVO$_4$:Eu) under 147 nm excitation was adopted as 100. As apparent from the figure, the luminescence intensity became 100% or greater in a region of $0 < b < 0.75$, and Y$_{0.96}$Eu$_{0.04}$P$_{0.65}$V$_{0.35}$O$_4$ exhibited the highest luminescence intensity of 168%. On the other hand, in a region of $0.75 \leq b \leq 1.0$, the luminescence intensity decreased to 82% due to the transformation from zircon structure to zenotime structure. As will be described later, however, the luminescence intensity under 150–155 nm excitation is higher than those of europium activated yttrium vanadate. Under 58.4–290 nm excitation, the principal emission line lies always at 619 nm ($^5$D$_0$→$^7$F$_2$) due to the dipole-dipole transition irrespective of the excitation wavelengths, but there exists a tendency that the satellite emission intensity in the vicinity of 590 nm ($^5$D$_0$→$^7$F$_1$) due to the magnetic dipole transition is increased or decreased to some extent depending upon the value b or the excitation wavelength. As will be stated later, however, C.I.E. plots of these phosphors were substantially constant independently of the values b.

Figure 9:
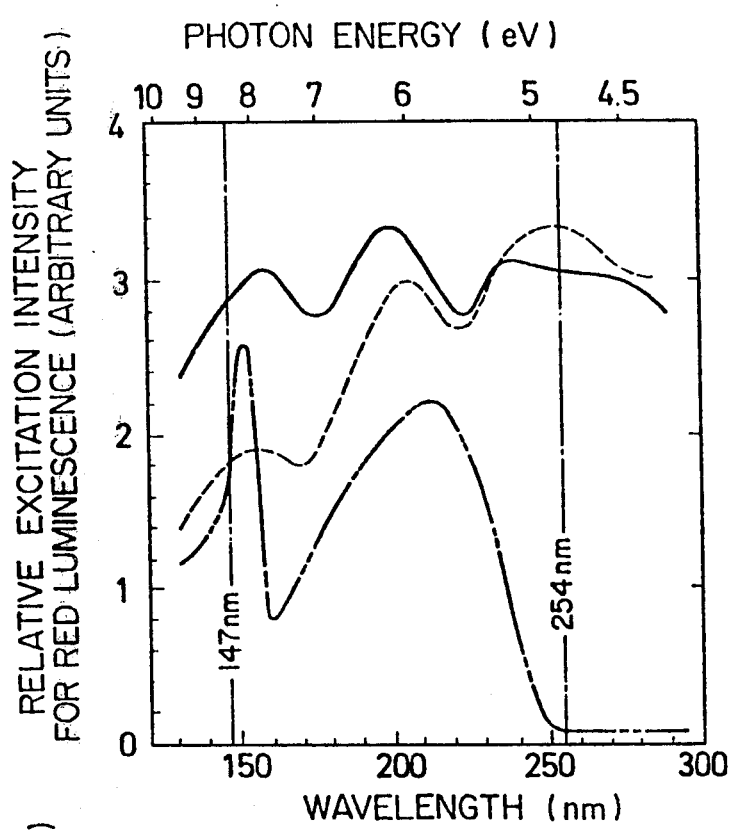
FIG. 9 shows the excitation spectra of the red phosphors $YVO_4:Eu$, $Y_{0.96}Eu_{0.04}P_{0.65}V_{0.35}O_4$ and $Y_{0.96}Eu_{0.04}PO_4$ in a region of 130–290 nm.

FIG. 9 shows the excitation spectra of three phosphors as a function of the wavelength. The values of b in Y$_{0.96}$Eu$_{0.04}$P$_b$V$_{1-b}$O$_4$ are zero (broken line), 0.65 (solid line) and 1.0 (two-dot chain line). Although the luminescence intensity of a known phosphor having b=0 was higher than that of a phosphor at b=0.65 in a region of wavelengths longer than 240 nm, the intensity difference became larger in a region consisting of wavelengths shorter than 240 nm, and the intensity of a phosphor at b=0.65 reached 168% at 147 nm. It is also easily understood from FIG. 9 that when a phosphor at b=0.65 is excited by a radiation in the vicinity of 200 nm, the highest luminous efficiency is attained. It is indicated that a phosphor at b=1.0 (two-dot chain line) reveals an intensity of 137% comparing with that of a known phosphor at b=0 (broken line) in a region of 150–155 nm.

Embodiment 12

Red phosphors represented by the formula Y$_{1-a}$Eu$_a$P$_{0.65}$V$_{0.35}$O$_4$ where $0 < a < 1.0$ were prepared. For example, for a compound in which a=0.20 and whose total amount of charge was 100 gr., the following five raw materials were mixed well:

| | |
|---|---|
| yttrium oxide (Y$_2$O$_3$) | 39.4 gr. |
| europium oxide (Eu$_2$O$_3$) | 6.8 gr. |
| diammonium hydrogen phosphate [(NH$_4$)$_2$HPO$_4$] | 36.5 gr. |
| vanadium pentaoxide (V$_2$O$_5$) | 13.6 gr. |

| | |
|---|---|
| -continued | |
| sodium carbonate (Na$_2$CO$_3$) | 3.7 gr. |

Thereafter, the mixture was fired by the same method as described in Embodiment 10.

Figure 10:
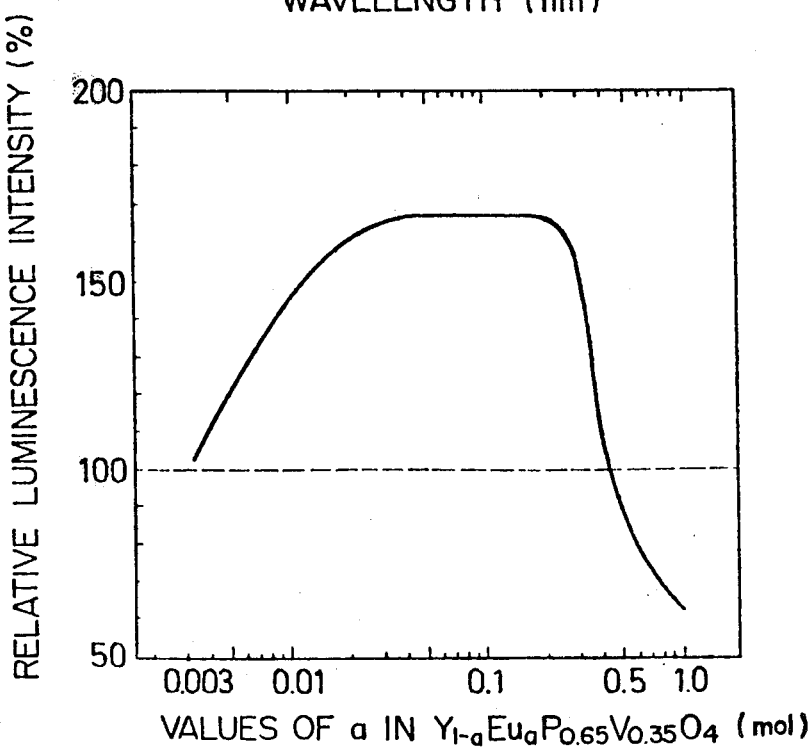
FIG. 10 shows the relationship between the value a in a $Y_{1-a}Eu_aP_{0.65}V_{0.35}O_4$ and the luminencence intensity under 147 nm excitation.

FIG. 10 shows the relationship between the luminescence intensity under 147 nm excitation and the europium concentrations. In this figure, the luminescence intensity of a known phosphor, europium activated yttrium vanadate having an europium concentration of 0.04 mol was adopted as 100. As apparent from the figure, the luminescence intensity was as high as 110% even in a region corresponding to 1.10 of the europium concentration described in Embodiments 10 and 11, and the highest luminescence intensity of 168% was obtained in a wide region of $0.04 \leq a \leq 0.30$. On the other hand, the luminescence intensity dropped down to 65% in a region of $0.30 < a < 1.0$. However, it is noted that the intensity of the phosphor having $0.30 < a < 1.0$ becomes higher in the vicinity of 200 nm or in a region of wavelengths shorter than 130 nm comparing with that of YVO$_4$:Eu. The color purity was also improved in the region of $0.30 < a < 1.0$. For example, the satellite emission intensity at 611 nm to the principal emission line intensity at 619 nm of trivalent europium ($I_{611}/I_{619}$) was 0.41 at a=0.04, 0.46 at a=0.4, and 0.49 at a=0.8.

The above embodiments are concerned with the red phosphors represented by the formula $M_{1-a}Eu_aP_bV_{1-b}O_4$, where M stands for Y. For the other trivalent europium activated phosphors where M stands for Sc (scandium) and In (indium) according to the previously cited "Crystal Structure" Vol. 3 by Wyckoff, similar effects are obtained by the adjustments of the values a and b.

The above embodiments are also concerned with the characteristics on the red phosphor which become the constituting elements of light emitting devices. A phosphor screen obtained by mixing an adequate amount of binder into such powder phosphors and coating on a glass substrate reveals similar characteristics as those on the powder phospors and has a good maintenance. Effects of this kind will be described in the following embodiments.

Embodiment 13

There was fabricated a fluorescent discharge lamp which does not use mercury vapor at all and which is of such type that 147 nm radiation is generated in the positive column space of a discharge space and that the radiation is converted into visible light. In the first stage, an adequate amount of glass powder was mixed into any of the phosphors as shown in Embodiments 10, 11 and 12. In the second stage, an acrylic thinner solution was dropped into the mixture to prepare a phosphor suspension having an appropriate viscosity. Thereafter, the suspension was poured through a nozzle from one end of a commercial fluorescent discharge tube having a diameter of 25 mm $\phi$ or 32 mm $\phi$. Alternatively, it was printed through a stainless steel sieve of 250 meshes onto a glass substrate of 150 mm×150 mm×1 mm. Thereafter, the suspension was baked in the air at temperatures below 600° C. for 2-3 hours, to form a uniform phosphor screen having a predetermined thickness of 15-30 microns. The phosphor screen printed on the glass substrate was cut along with the substrate into small square pieces being 10-15 mm long in one side. The small piece was inserted into the commercial discharge tube and fixed with a nickel or glass holder. After the usual filament mounting work and baking work, the tube was filled with 1 Torr of purified xenon (Xe). Thus, the fluorescent lamp without mercury vapor was manufactured. The A.C. starting voltage $V_s$ of the discharge lamp having a tube diameter of 32 mm $\phi$ and a tube length of 500 mm was 170 V, while the tube current density $I_L$ under the steady discharge could change from 0.02 A/cm$^2$ to 0.07 A/cm$^2$.

Examples of the relative brightnesses of the phosphor screens at $I_l$=0.44 A/cm$^2$ (fixed) are given in Table 2.

TABLE 2

| | Phosphor Composition | Presence or Absence of Glass Powder | Relative Brightness |
|---|---|---|---|
| 1 | YVO$_4$ : Eu | Absent | 100 |
| 2 | YVO$_4$ : Eu | Present | 95 |
| 3 | Y$_{0.96}$Eu$_{0.04}$P$_{0.65}$V$_{0.35}$O$_4$ | Absent | 228 |
| 4 | Y$_{0.96}$Eu$_{0.04}$P$_{0.65}$V$_{0.35}$O$_4$ | Present | 153 |
| 5 | Y$_{0.88}$Eu$_{0.12}$P$_{0.65}$V$_{0.35}$O$_4$ | Present | 162 |

As apparent from the table, the relative brightness of the identical phosphor decreases due to the mixing of the glass powder. When, in this regard, the phosphor screens associated with this invention and the well-known phosphor screen made of europium activated yttrium vanadate are compared, the brightness of the phosphor composition of this invention is 153 while that of the previously known phosphor composition is 95, and it is understood that the brightness associated with this invention increases by 60% or greater. This result corresponds well to the results of the comparisons of the characteristics on the powder of phosphors described in detail in connection with Embodiments 10 and 11. Regarding the actually mounted phosphor screens, it has also been confirmed that the effect of this invention is remarkable.

Figure 11:
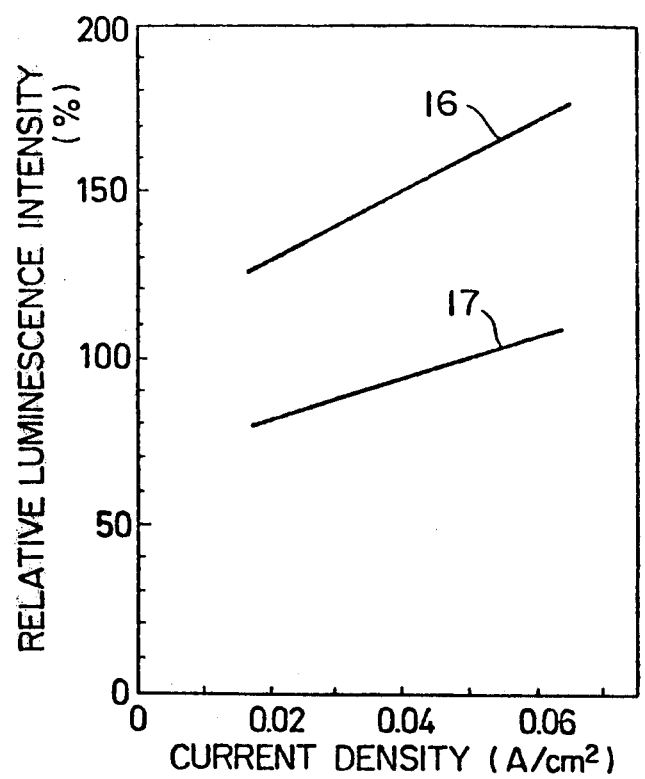
FIG. 11 shows the relative luminescence intensity for phosphor screen actually equipped in a xenon-filled discharge lamp as a function of the current densities.

FIG. 11 shows a relationship between the discharge current density and the relative brightness for such phosphor screens as listed in Table 2. The relative brightness for 16 associated with this invention has better characteristics as compared with a known phosphor screen 17. The C.I.E. plots of 16 were distributed over X=0.61-0.65 and Y=0.31-0.33.

Embodiment 14

A xenon gas discharge cell applicable for a plasma display as shown in FIG. 6 was fabricated using red phosphor screens.

The relative brightness of the discharge cell under pressure of 20-100 Torr, were the same as already shown in Table 2.

Although the effects of this invention have been described in detail in conjunction with the above five embodiments, some additional explanation will be made hereunder concerning the application field of this invention. If the discharge space of a hot cathode type discharge lamp described in Embodiment 13 is extremely reduced, a cold cathode type structure as described in Embodiment 14 is realized. And then, a well-known "mini-cell" can be established as a result of the ratio of the positive column space to the negative glow space. Accordingly, lowering in the color purity of the light emitting screen due to the superposition of the positive column spectrum is negligible, and a good plasma display is possible. On the other hand, in order to produce a white color for the application field of illumination, it is desirable to use a combination of the red phosphors of this invention with other blue and green phosphors. After mixing these phosphors at an appropriate ratio, the mixture is coated onto the inner wall of a hot cathode type discharge tube by the method described in Embodiment 13, together with a rare gas such as xenon, krypton, argon and neon. The mean color rendering index of the discharge lamp can be adjusted, not only by changing the mixing ratios of the phosphors, but also by selecting the rare gas combinations. When only two color phosphors of this invention are used together with a mixture gas consisting of neon and xenon, the discharge tube can be utilized, for a lamp in the field of growth or admiration of plants. Since the fluorescent discharge lamp of this type does not involve mercury vapor as the irradiation source, it has the great advantage of not being detrimental to the human body. Where the light emitting screen of this invention is employed for a red indicator, both types of structure having a cold or hot cathode can be adopted. However, it is desirable to utilize a system which can emit low energy electrons from helium gas plasma as described in Embodiment 4.

Embodiment 15

Trivalent europium ($Eu^{3+}$) activated red phosphors represented by the formula $M_{1-a}Eu_aP_bV_{1-b}O_4$, where M stands for Gd and where $0<a<1.0$ and $0<b\leq 1.0$, were prepared. For example, for a compound in which $a=0.04$ and $b=0.65$ and whose total amount of charge was 100 gr., the following four raw materials were mixed well:

| | |
|---|---|
| gadolinium oxide ($Gd_2O_3$) | 52.9 gr. |
| europium oxide ($Eu_2O_3$) | 2.1 gr. |
| diammonium hydrogen phosphate [$(NH_4)_2HPO_4$] | 28.7 gr. |
| vanadium pentaoxide ($V_2O_5$) | 10.6 gr. |
| Thereafter, hygroscopic sodium carbonate | 5.7 gr. | was added to the mixture. The resultant mixture was mixed again, and was fired by the same method as described in Embodiment 10. Then, a pure-white phosphor was obtained.

Figure 12:
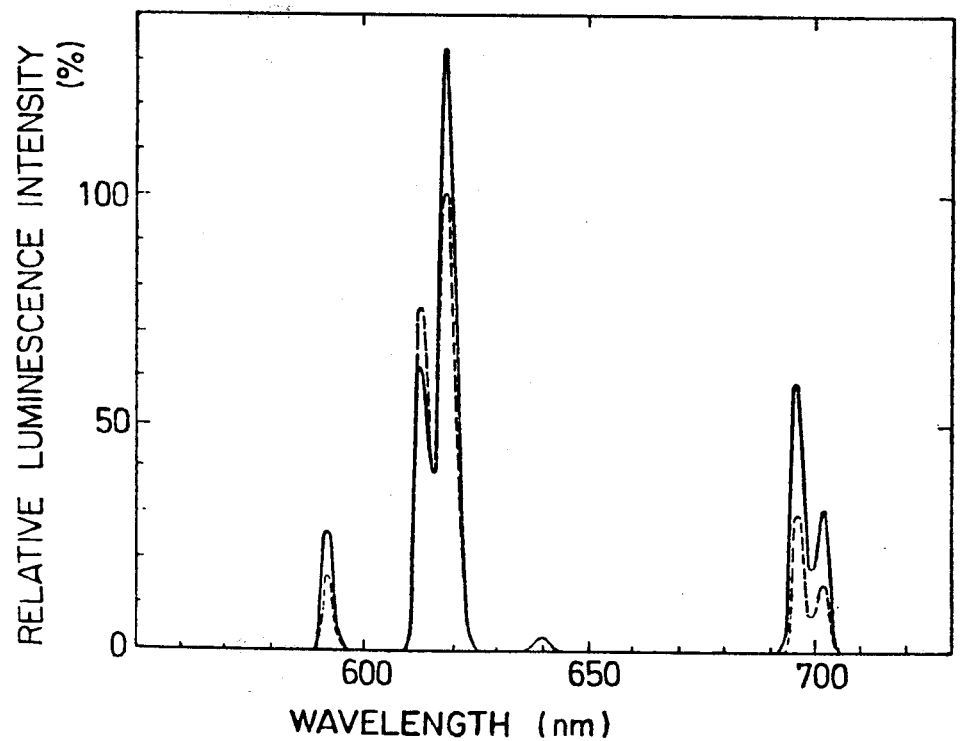
FIG. 12 shows the luminescence spectra of phosphors $YVO_4:Eu$ and $Gd_{0.96}Eu_{0.04}P_{0.65}V_{0.35}O_4$ under 147 nm excitation.

FIG. 12 shows the luminescence spectra under 174 nm excitation as a function of the wavelength. A broken curve in the figure represents the luminescence intensity distribution for a known phosphor, europium activated yttrium vanadate ($YVO_4$:Eu), while a solid line in the figure represents the relative luminescence intensity distribution for $Gd_{0.96}Eu_{0.04}P_{0.65}V_{0.35}O_4$. As apparent from the figure, the intensity of the solid line at 619 nm reaches 133% relative to that of the broken line.

The same characteristics were observed for $Gd_{0.88}Eu_{0.12}P_{0.65}V_{0.35}O_4$.

The foregoing Embodiments 10–15 relate to the characteristics of the red phosphors according to this invention. And the phosphors were fired at 1,250° C. using diammonium hydrogen phosphate as the starting material of phosphorus. In order to obtain better characteristics of red phosphors associated with this invention, it is preferable to use rare-earth orthophosphate instead of diammonium hydrogen phosphate as the raw material of phosphorus and it is also preferable to fire at a temperature higher than 1,250° C.

While the novel embodiments of the invention have been described, it will be understood that various omissions, modifications and changes in these embodiments may be made by one skilled in the art without departing from the spirit and scope of the invention.

What is claimed is:

1. A light emitting device, comprising:
a light-permeable envelope,
an exciting source providing excitation energy ranging from 5 to 25 eV, said exciting source being a gas selected from the group consisting of xenon, krypton, argon, neon, helium, or a mixture thereof, and
a luminescent screen which is provided inside said envelope at which it can convert said excitation energy from said exciting source into red visible light, said luminescent screen containing a phosphor represented by the general formula:

$$M_{1-a}Eu_aP_bV_{1-b}O_4$$

Where M stands for at least one member selected from the group consisting of yttrium, scandium, rare-earth elements having atomic numbers of 57-62 and 64-71, and group-IIIb elements of the periodic table, and where $0<a<1.0$ and $0<b\leq 1.0$.

2. The light emitting device according to claim 1, wherein said excitation energy is 147 nm.

3. The light emitting device according to claim 1, wherein said excitation energy is at 200 nm.

4. The light emitting device according to claim 1, wherein said exciting source is provided from xenon gas.

5. The light emitting device according to claim 1, wherein said exciting source is provided from helium gas.

6. The light emitting device according to claim 1, wherein said exciting source excludes mercury vapor.

7. The light emitting device according to claim 1, wherein said phosphor has a composition of $Y_{1-a}Eu_aP_{0.65}V_{0.35}O_4$, $(0<a<1)$.

8. The light emitting device according to claim 1, wherein said phosphor has a composition of $Y_{0.96}Eu_{0.04}P_bV_{1-b}O_4$, $(0<b<1)$.

9. The light emitting device according to claim 1, wherein said phosphor has a composition of $Y_{0.96}Eu_{0.04}P_{0.65}V_{0.35}O_4$.

10. The light emitting device according to claim 1, wherein said phosphor has a composition of $Y_{0.83}Eu_{0.12}P_{0.65}V_{0.35}O_4$.

11. The light emitting device according to claim 1, wherein said phosphor has a composition of $Sc_{1-a}Eu_aP_bV_{1-b}O_4$.

12. The light emitting device according to claim 1, wherein said phosphor has a composition of $Gd_{1-a}Eu_aP_bV_{1-b}O_4$, $(0<a<1)$ and $(0<b\leq 1)$.

13. The light emitting device according to claim 12, wherein said phosphor has a composition of $Gd_{0.96}Eu_{0.04}P_{0.65}V_{0.35}O_4$.

14. The light emitting device according to claim 12, wherein said phosphor has a composition of $Gd_{0.88}Eu_{0.12}P_{0.65}V_{0.35}O_4$.

* * * * *